(12) United States Patent
Young

(10) Patent No.: US 11,884,239 B2
(45) Date of Patent: Jan. 30, 2024

(54) VEHICLE THEFT RECORDING SYSTEM

(71) Applicant: Tomika Young, Washington, DC (US)

(72) Inventor: Tomika Young, Washington, DC (US)

( * ) Notice: Subject to any disclaimer, the term of this patent is extended or adjusted under 35 U.S.C. 154(b) by 0 days.

(21) Appl. No.: 17/194,374

(22) Filed: Mar. 8, 2021

(65) Prior Publication Data

US 2022/0281414 A1 Sep. 8, 2022

(51) Int. Cl.
*B60R 25/30* (2013.01)
*B60R 25/10* (2013.01)
*B60R 25/33* (2013.01)
*B60R 1/12* (2006.01)

(52) U.S. Cl.
CPC .............. *B60R 25/305* (2013.01); *B60R 1/12* (2013.01); *B60R 25/10* (2013.01); *B60R 25/33* (2013.01); *B60R 2001/1253* (2013.01); *B60R 2025/1013* (2013.01); *B60R 2300/105* (2013.01); *B60R 2300/8073* (2013.01)

(58) Field of Classification Search
CPC .. B60R 1/00; B60R 1/12; B60R 11/00; B60R 11/02; B60R 11/04; B60R 25/00; B60R 25/102; B60R 25/104; B60R 25/30; B60R 35/102; B60R 25/305; B60R 25/34; G08G 1/16; G08G 1/166; G08G 1/167
See application file for complete search history.

(56) References Cited

U.S. PATENT DOCUMENTS

| | | | | |
|---|---|---|---|---|
| 9,327,685 | B1* | 5/2016 | Wooten | B60R 25/305 |
| 2002/0003571 | A1* | 1/2002 | Schofield | B60R 11/0235 |
| | | | | 348/148 |
| 2018/0072269 | A1* | 3/2018 | Tong | B60R 25/305 |

OTHER PUBLICATIONS

NPL Search (Jan. 21, 2022).*

* cited by examiner

*Primary Examiner* — Van T Trieu
(74) *Attorney, Agent, or Firm* — The Iwashko Law Firm, PLLC; Lev Ivan Gabriel Iwashko

(57) ABSTRACT

A vehicle theft recording system, including a first exterior camera disposed on at least a portion of a front portion of a vehicle to record at least one first visual data of a surrounding area in a front of the vehicle thereon, a second exterior camera disposed on at least a portion of a rear portion of the vehicle opposite with respect to the front portion of the vehicle to record at least one second visual data of a surrounding area in a rear of the vehicle thereon, a first mirror camera disposed on at least a portion of a first mirror of the vehicle to record at least one third visual data of a surrounding area on a first side of the vehicle thereon, a second mirror camera disposed on at least a portion of a second mirror of the vehicle opposite with respect to the first side of the vehicle to record at least one fourth visual data of a surrounding area on a second side of the vehicle thereon, an interior camera disposed on at least a portion of a dashboard of the vehicle to record at least one fifth visual data of a surrounding area within an interior of the vehicle thereon, and an alert unit disposed within at least a portion of the vehicle to respond to an alert based on a presence of at least one unauthorized user within and around the vehicle.

6 Claims, 4 Drawing Sheets

VEHICLE THEFT RECORDING SYSTEM

BACKGROUND

1. Field

The present general inventive concept relates generally to a recording system, and particularly, to a vehicle theft recording system.

2. Description of the Related Art

It is estimated that nearly three-quarters of a million motor vehicle thefts occur nationwide and most owners are unable to retrieve their vehicles after theft. A vehicle that becomes stolen by a thief presents a variety of problems, such as loss of convenience in transportation, money spent on the vehicle, and/or difficulty in retrieval. An owner will likely seek assistance from a law enforcement officer, which is often a pointless endeavor due to lack of information related to the crime and/or evidence. Furthermore, the investigation process is costly and can last for extended periods of time.

Many vehicles have alarm systems that use alarm sounds and/or anti-theft systems to prevent access within the vehicle. However, the alarm systems and/or the anti-theft systems don't always deter thieves and don't provide means for the law enforcement official to determine where the vehicle is taken and/or an identity of the thief.

Therefore, there is a need for a vehicle theft recording system that makes a visual record and tracks a location of the vehicle during a vehicle theft.

SUMMARY

The present general inventive concept provides a vehicle theft recording system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vehicle theft recording system, including a first exterior camera disposed on at least a portion of a front portion of a vehicle to record at least one first visual data of a surrounding area in a front of the vehicle thereon, a second exterior camera disposed on at least a portion of a rear portion of the vehicle opposite with respect to the front portion of the vehicle to record at least one second visual data of a surrounding area in a rear of the vehicle thereon, a first mirror camera disposed on at least a portion of a first mirror of the vehicle to record at least one third visual data of a surrounding area on a first side of the vehicle thereon, a second mirror camera disposed on at least a portion of a second mirror of the vehicle opposite with respect to the first side of the vehicle to record at least one fourth visual data of a surrounding area on a second side of the vehicle thereon, an interior camera disposed on at least a portion of a dashboard of the vehicle to record at least one fifth visual data of a surrounding area within an interior of the vehicle thereon, and an alert unit disposed within at least a portion of the vehicle to respond to an alert based on a presence of at least one unauthorized user within and around the vehicle.

The first exterior camera and the second exterior camera each may include a global positioning system (GPS) to track a location of the vehicle.

The first exterior camera, the second exterior camera, the first mirror camera, the second mirror camera, and the interior camera each may include a sensor to detect movement within a predetermined range thereof.

The alert unit may emit an alarm sound within the vehicle.

The alert unit may project at least one visual item on at least one window of the vehicle indicating the vehicle is stolen.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
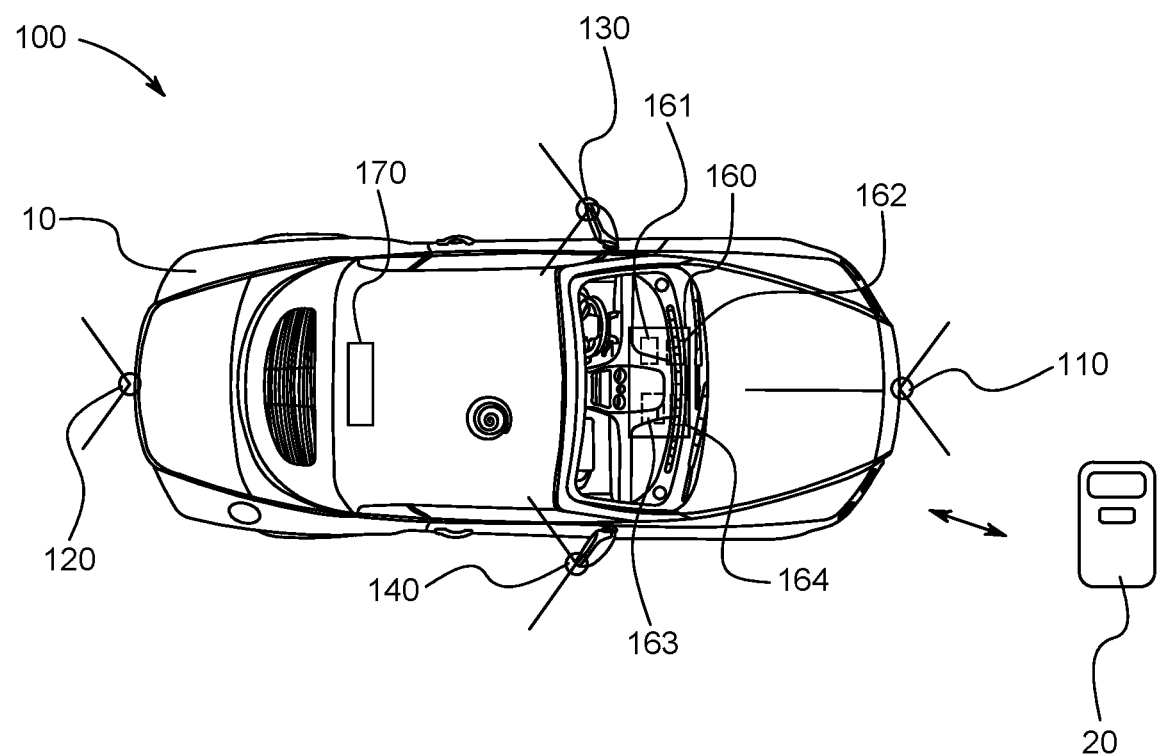
FIG. 1 illustrates an elevational top view of a vehicle theft recording system as disposed on a vehicle, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Vehicle Theft Recording System 100
First Exterior Camera 110
Second Exterior Camera 120
First Mirror Camera 130
Second Mirror Camera 140
Interior Camera 150
Control Unit 160
Input Unit 161
Processing Unit 162
Communication Unit 163
Storage Unit 164
Alert Unit 170

FIG. 1 illustrates an elevational top view of a vehicle theft recording system 100 as disposed on a vehicle 10, according to an exemplary embodiment of the present general inventive concept.

Figure 2A:
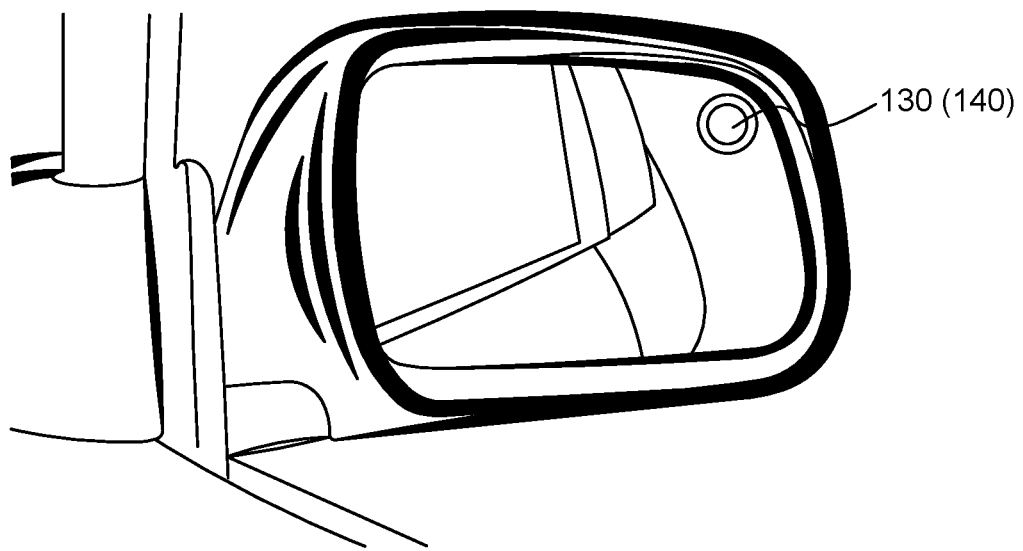
FIG. 2A illustrates a zoomed in view of a first mirror camera as disposed on a first side of a mirror of the vehicle, according to an exemplary embodiment of the present general inventive concept.

FIG. 2A illustrates a zoomed in view of a first mirror camera 130 as disposed on a first side of a mirror of the vehicle 10, according to an exemplary embodiment of the present general inventive concept.

Figure 2B:
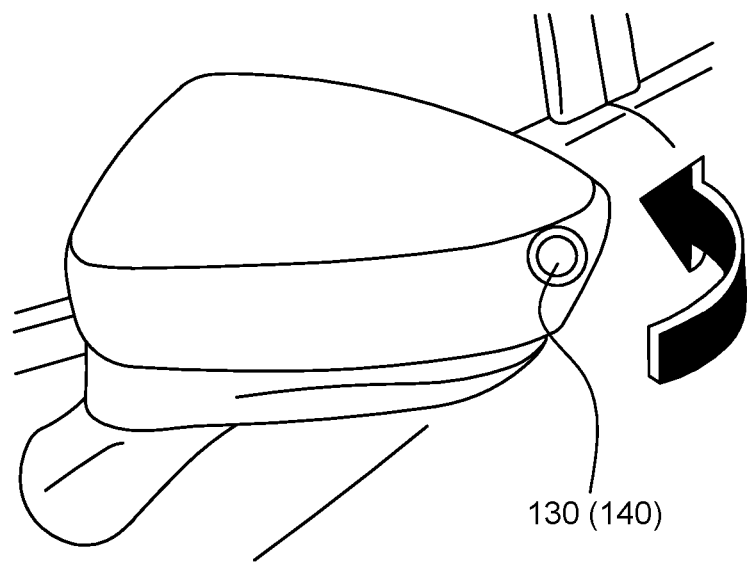
FIG. 2B illustrates a zoomed in view of the first mirror camera as disposed on a second side of the mirror of the vehicle, according to an exemplary embodiment of the present general inventive concept.

FIG. 2B illustrates a zoomed in view of the first mirror camera 130 as disposed on a second side of the mirror of the vehicle 10, according to an exemplary embodiment of the present general inventive concept.

Figure 3:
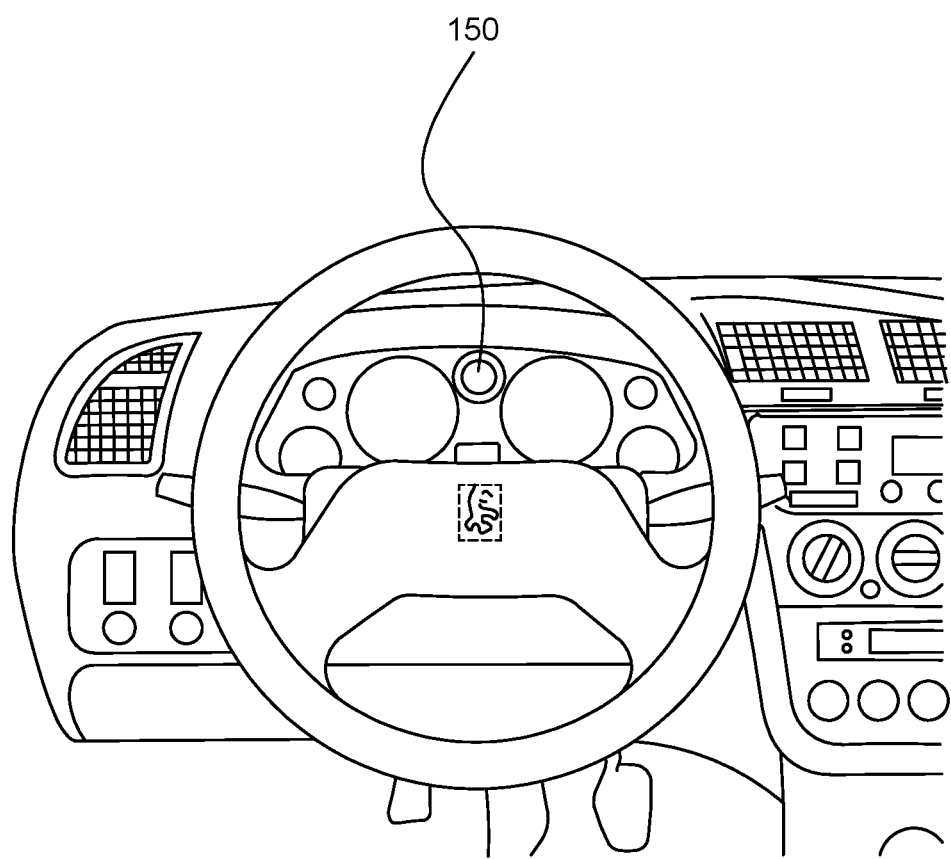
FIG. 3 illustrates a zoomed in view of an interior camera as disposed on a dashboard of the vehicle, according to an exemplary embodiment of the present general inventive concept.

FIG. 3 illustrates a zoomed in view of an interior camera 150 as disposed on a dashboard of the vehicle 10, according to an exemplary embodiment of the present general inventive concept.

The vehicle theft recording system 100 may be constructed from at least one of metal, plastic, wood, and rubber, etc., but is not limited thereto.

Referring to FIGS. 1 through 3, the vehicle theft recording system 100 may include a first exterior camera 110, a second exterior camera 120, a first mirror camera 130, a second mirror camera 140, an interior camera 150, a control unit 160, and an alert unit 170, but is not limited thereto.

The vehicle theft recording system 100 may be retrofit and/or integrated into a vehicle 10 during manufacture.

The first exterior camera 110, the second exterior camera 120, the first mirror camera 130, the second mirror camera 140, and/or the interior camera 150 may include any type of camera known to one of ordinary skill in the art, including, but not limited to, an action camera, an animation camera, an autofocus camera, a box camera, a camcorder, a camera phone, a compact camera, a dashboard camera (i.e., a Dashcam), a digital camera, a field camera, a FIREWIRE camera, a helmet camera, a high-speed camera, an instant camera, a keychain camera, a live-preview digital camera, a movie camera, an omnidirectional camera, a pinhole camera, a pocket camera, a pocket video camera, a rangefinder camera, a reflex camera, a remote camera, a stereo camera, a still camera, a still video camera, a subminiature camera, a system camera, a thermal imaging camera, a thermographic camera, a traffic camera, a traffic enforcement camera, a twin-lens reflex camera, a video camera, a view camera, a webcam, a WRIGHT camera, a ZENITH camera, and a zoom-lens reflex camera.

Additionally, the first exterior camera 110 and/or the second exterior camera 120 may further include a global positioning system (GPS) and a sensor.

The first exterior camera 110 may be disposed on at least a portion of a front portion of the vehicle 10. The first exterior camera 110 may record at least one first visual data, such as at least one first picture and/or at least one first video thereon. More specifically, the first exterior camera 110 may record the at least one first visual data of a surrounding area in a front of the vehicle 10, including an environment, a person, and/or an object.

Moreover, the first exterior camera 110 may track a location of the vehicle 10 using the GPS.

The second exterior camera 120 may be disposed on at least a portion of a rear portion of the vehicle 10 opposite with respect to the front portion of the vehicle 10. The second exterior camera 120 may record at least one second visual data, such as at least one second picture and/or at least one second video thereon. More specifically, the second exterior camera 120 may record the at least one second visual data of a surrounding area in a rear of the vehicle 10, including an environment, a person, and/or an object.

Moreover, the second exterior camera 120 may track the location of the vehicle 10 using the GPS.

Additionally, the first mirror camera 130 and/or the second mirror camera 140 may further include a sensor.

Referring again to FIGS. 2A and 2B, the first mirror camera 130 may be disposed on at least a portion of a first side of a first mirror of the vehicle 10. Alternatively, the first mirror camera 130 may be disposed on at least a portion of a second side of the first mirror of the vehicle 10 opposite with respect to the first side of the first mirror. For example, the first mirror camera 130 may be disposed on the first side of the first mirror of the vehicle 10, such that the first mirror is non-movable. The first mirror camera 130 may be disposed on the second side of the first mirror of the vehicle 10, such that the first mirror is movable (i.e. pivotable and/or rotatable).

The first mirror camera 130 may record at least one third visual data, such as at least one third picture and/or at least one third video thereon. More specifically, the first mirror camera 130 may record the at least one third visual data of a surrounding area on a first side of the vehicle 10, including an environment, a person, and/or an object.

Referring again to FIGS. 2A and 2B, the second mirror camera 140 may be disposed on at least a portion of a first side of a second mirror of the vehicle 10. Alternatively, the second mirror camera 130 may be disposed on at least a portion of a second side of the second mirror of the vehicle 10 opposite with respect to the first side of the second mirror. For example, the second mirror camera 140 may be disposed on the first side of the second mirror of the vehicle 10, such that the second mirror is non-movable. The first mirror camera 130 may be disposed on the second side of the first mirror of the vehicle 10, such that the first mirror is movable (i.e. pivotable and/or rotatable).

The second mirror camera 140 may record at least one fourth visual data, such as at least one fourth picture and/or at least one fourth video thereon. More specifically, the second mirror camera 140 may record the at least one fourth visual data of a surrounding area on a second side of the vehicle 10 opposite with respect to the first side of the vehicle 10, including an environment, a person, and/or an object.

Additionally, the interior camera 150 may further include a sensor.

Referring again to FIG. 3, the interior camera 150 may be disposed on at least a portion of a dashboard of the vehicle 10. The interior camera 150 may record at least one fifth visual data, such as at least one picture and/or at least one fifth video thereon. More specifically, the interior camera 150 may record the at least one fifth visual data of a surrounding area within an interior of the vehicle 10, including an environment, a person, and/or an object. For example, the interior camera 150 may record at least one unauthorized user (i.e. a thief) thereon.

Accordingly, as described above, the first exterior camera 110, the second exterior camera 120, the first mirror camera 130, the second mirror camera 140, and/or the interior camera 150 may provide different views within and/or outside the vehicle 10.

Although the vehicle theft recording system 100 describes only five cameras, the vehicle theft recording system 100 may be a single camera, at least one camera, and/or any number of cameras depending on a preference of at least one authorized user. Also, although the first exterior camera 110, the second exterior camera 120, the first mirror camera 130, the second mirror camera 140, and/or the interior camera 150 refer to theft, the first exterior camera 110, the second exterior camera 120, the first mirror camera 130, the second mirror camera 140, and/or the interior camera 150 may be used to record during driving, such that an accident may be recorded. As such, the events during the accident may be recorded.

The control unit 160 may include an input unit 161, a processing unit 162, a communication unit 163, and a storage unit 164, but is not limited thereto.

The input unit 161 may include a keyboard, a touchpad, a mouse, a trackball, a stylus, a voice recognition unit, a visual data reader, a camera, a wireless device reader, a fingerprint reader, an iris scanner, a facial recognition unit, and a holographic input unit.

The processing unit 162 (or central processing unit, CPU) may include electronic circuitry to carry out instructions of a computer program by performing basic arithmetic, logical, control and input/output (I/O) operations specified by the instructions. The processing unit 162 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 162 may also include a microprocessor and a microcontroller.

The communication unit 163 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit 164 may include a random access memory (RAM), a read-only memory (ROM), a hard disk, a flash drive, a database connected to the Internet, cloud-based storage, Internet-based storage, or any other type of storage unit.

The processing unit 162 may access the Internet via the communication unit 163 to allow the user to access a website, and/or may allow a mobile application and/or the software application to be executed using the processing unit 162. For ease of description, the mobile and/or the software application will be hereinafter referred to as an app. The app may be downloaded from the Internet to be stored on the storage unit 164.

The control unit 160 may be mechanically and/or electrically connected to at least a portion of the first exterior camera 110, the second exterior camera 120, the first mirror camera 130, the second mirror camera 140, and/or the interior camera 150. The processing unit 162 executing the app may control operations of the first exterior camera 110, the second exterior camera 120, the first mirror camera 130, the second mirror camera 140, and/or the interior camera 150.

The storage unit 164 may store all data from the first exterior camera 110, the second exterior camera 120, the first mirror camera 130, the second mirror camera 140, and/or the interior camera 150. Moreover, the processing unit 162 may execute the app to control the sensor of the first exterior camera 110, the second exterior camera 120, the first mirror camera 130, the second mirror camera 140, and/or the interior camera 150 to detect movement within a predetermined range of the first exterior camera 110, the second exterior camera 120, the first mirror camera 130, the second mirror camera 140, and/or the interior camera 150. In other words, the first exterior camera 110, the second exterior camera 120, the first mirror camera 130, the second mirror camera 140, and/or the interior camera 150 may record in response to detecting movement within the surrounding area, such as from the at least one unauthorized user and/or a change in location of the first exterior camera 110 and/or the second exterior camera based on the GPS, such that the processing unit 162 may not detect a presence of the at least one authorized user using an external device 20, which may also run the app thereon.

Also, the input unit 161 may receive at least one input from the at least one authorized user to configure the first exterior camera 110, the second exterior camera 120, the first mirror camera 130, the second mirror camera 140, and/or the interior camera 150, such as a type of recording (e.g., picture, video).

The processing unit 162 executing the app may be configured to transmit an alert signal via the communication unit 163 to the external device 20 of the at least one authorized user, at least one insurance company, and/or at least one first responder (e.g., law enforcement official, fire fighter, emergency medical technician (EMT)) in response to detecting movement within the surrounding area, such that the interior camera 150 may record the at least one unauthorized user. As such, the interior camera 150 may facilitate identifying the at least one unauthorized user.

The first exterior camera 110, the second exterior camera 120, the first mirror camera 130, the second mirror camera 140, and/or the interior camera 150 may be configured using the processing unit 162 executing the app to record on each of the cameras and/or transmit the alert signal via the communication unit 163 to the external device 20 of the at least one authorized user while the vehicle 10 is parked and/or inactive (e.g., off).

Also, the processing unit 162 executing the app may be configured to transmit the alert signal via the communication unit 163 to the external device 20 of the at least one authorized user in response to the at least one unauthorized user being within a predetermined distance and/or proximity of the vehicle 10, such as three feet, five feet, ten feet, twenty feet, etc. In other words, the user may configured the predetermined distance and/or sensitivity of which the processing unit 162 transmits the alert signal. Additionally, the processing unit 162 executing the app may be configured to create a timer for the first exterior camera 110, the second exterior camera 120, the first mirror camera 130, the second mirror camera 140, and/or the interior camera 150 for an amount of time desired by the user, such as thirty seconds, one minute, two minutes, five minutes, etc.

The alert unit 170 may include an alarm device and a projection device, but is not limited thereto.

The alert unit 170 may be disposed within at least a portion of the vehicle 10. The alert unit 170 may to respond to an alert based on the processing unit 162 determine a presence of the at least one unauthorized user within and/or around the vehicle 10. For example, the alert unit 170 may emit an alarm sound outside of and/or within the vehicle 10 to deter the at least one unauthorized user therein from continuing theft of the vehicle 10. Also, the alert unit 170 may render at least one visual item, such as an image, a picture, a word, a letter, and/or a symbol on at least one window within the vehicle 10 to indicate the vehicle 10 has been stolen. Furthermore, the alert unit 170 may be mechanically and/or electrically connected to the control unit 160. Therefore, the alert unit 170 may project the at least one visual item on the at least one window within the vehicle 10 in response to the processing unit 162 executing the app.

Alternatively, the input unit 161 may receive the input for the alert unit 170 to configure the at least one visual item.

Therefore, the vehicle theft recording system 100 may create a visual record of a theft of the vehicle 10, such that the least one authorized user and/or the at least one first responder may determine an identity of the at least one unauthorized user. Also, the vehicle theft recording system 100 may track the location of the vehicle 10 to facilitate recovery of the vehicle 10.

The present general inventive concept may include a vehicle theft recording system 100, including a first exterior camera 110 disposed on at least a portion of a front portion of a vehicle 10 to record at least one first visual data of a surrounding area in a front of the vehicle 10 thereon, a second exterior camera 120 disposed on at least a portion of a rear portion of the vehicle 10 opposite with respect to the front portion of the vehicle 10 to record at least one second visual data of a surrounding area in a rear of the vehicle 10 thereon, a first mirror camera 130 disposed on at least a portion of a first mirror of the vehicle 10 to record at least one third visual data of a surrounding area on a first side of the vehicle 10 thereon, a second mirror camera 140 disposed on at least a portion of a second mirror of the vehicle 10 opposite with respect to the first side of the vehicle 10 to record at least one fourth visual data of a surrounding area on a second side of the vehicle 10 thereon, an interior camera 150 disposed on at least a portion of a dashboard of the vehicle 10 to record at least one fifth visual data of a surrounding area within an interior of the vehicle 10 thereon, and an alert unit 170 disposed within at least a portion of the vehicle 10 to respond to an alert based on a presence of at least one unauthorized user within and around the vehicle 10.

The first exterior camera 110 and the second exterior camera 120 each may include a global positioning system (GPS) to track a location of the vehicle 10.

The first exterior camera 110, the second exterior camera 120, the first mirror camera 130, the second mirror camera 140, and the interior camera 150 each may include a sensor to detect movement within a predetermined range thereof.

The alert unit 170 may emit an alarm sound within the vehicle 10.

The alert unit 170 may project at least one visual item on at least one window of the vehicle 10 indicating the vehicle 10 is stolen.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A vehicle theft recording system, comprising:
   a first exterior camera disposed on at least a portion of a front portion of a vehicle to record at least one first visual data of a surrounding area in a front of the vehicle thereon;
   a second exterior camera disposed on at least a portion of a rear portion of the vehicle opposite with respect to the front portion of the vehicle to record at least one second visual data of a surrounding area in a rear of the vehicle thereon;
   a first mirror camera disposed on at least a portion of a first mirror of the vehicle to record at least one third visual data of a surrounding area on a first side of the vehicle thereon;
   a second mirror camera disposed on at least a portion of a second mirror of the vehicle opposite with respect to the first side of the vehicle to record at least one fourth visual data of a surrounding area on a second side of the vehicle thereon;
   an interior camera disposed on at least a portion of a dashboard of the vehicle to record at least one fifth visual data of a surrounding area within an interior of the vehicle thereon, such that the first exterior camera, the second exterior camera, the first mirror camera, the second mirror camera, and the interior camera record in response to detecting movement from at least one unauthorized user and a change in location of the first exterior camera and the second exterior camera; and
   an alert unit disposed within at least a portion of the vehicle to respond to an alert based on a presence of the at least one unauthorized user within and around the vehicle.

2. The vehicle theft recording system of claim 1, wherein the first exterior camera and the second exterior camera each comprise:
   a global positioning system (GPS) to track a location of the vehicle.

3. The vehicle theft recording system of claim 1, wherein the first exterior camera, the second exterior camera, the first mirror camera, the second mirror camera, and the interior camera each comprise:
   a sensor to detect movement within a predetermined range thereof.

4. The vehicle theft recording system of claim 1, wherein the alert unit emits an alarm sound within the vehicle.

5. The vehicle theft recording system of claim 1, wherein the alert unit projects at least one visual item on at least one window of the vehicle indicating the vehicle is stolen.

6. A vehicle theft recording system, comprising:
- a first exterior camera disposed on at least a portion of a front portion of a vehicle to record at least one first visual data of a surrounding area in a front of the vehicle thereon;
- a second exterior camera disposed on at least a portion of a rear portion of the vehicle opposite with respect to the front portion of the vehicle to record at least one second visual data of a surrounding area in a rear of the vehicle thereon;
- a first mirror camera disposed on at least a portion of a first mirror of the vehicle to record at least one third visual data of a surrounding area on a first side of the vehicle thereon;
- a second mirror camera disposed on at least a portion of a second mirror of the vehicle opposite with respect to the first side of the vehicle to record at least one fourth visual data of a surrounding area on a second side of the vehicle thereon;
- an interior camera disposed on at least a portion of a dashboard of the vehicle to record at least one fifth visual data of a surrounding area within an interior of the vehicle thereon;
- a control unit running a program thereon and connected to the first exterior camera, the second exterior camera, the first mirror camera, the second mirror camera, and the interior camera to control a type of recording of at least one of the first exterior camera, the second exterior camera, the first mirror camera, the second mirror camera, and the interior camera; and
- an alert unit disposed within at least a portion of the vehicle to respond to an alert based on a presence of at least one unauthorized user within and around the vehicle, and an absence of a presence of an external device running the program.

* * * * *